United States Patent [19]

Brill

[11] 3,807,657
[45] Apr. 30, 1974

[54] DUAL THRUST LEVEL MONOPROPELLANT SPACECRAFT PROPULSION SYSTEM

[75] Inventor: Yvonne Claeys Brill, Skillman, N.J.

[73] Assignee: RCA Corporation, New York, N.Y.

[22] Filed: Jan. 31, 1972

[21] Appl. No.: 221,955

[52] U.S. Cl. .............................................. 244/1 SB
[51] Int. Cl. .............................................. B64d 3/00
[58] Field of Search ...................................... 244/1; 60/200–204, 206–207, 218–220, 224–225, 229, 242

[56] References Cited
UNITED STATES PATENTS

| | | | |
|---|---|---|---|
| 2,968,919 | 1/1961 | Hughes et al. | 60/242 |
| 3,011,309 | 12/1961 | Carter | 60/242 |
| 3,015,210 | 1/1962 | Williamson et al. | 60/229 |
| 3,054,252 | 9/1962 | Beckett et al. | 60/203 |
| 3,231,223 | 1/1966 | Upper | 244/1 SA |
| 3,303,651 | 2/1967 | Grant, Jr. et al. | 60/203 |
| 3,535,879 | 10/1970 | Kuntz | 60/200 R |
| 3,673,801 | 7/1972 | Goldberger | 60/218 |
| 3,165,382 | 1/1965 | Forte | 60/218 |
| 3,583,161 | 6/1971 | Simms | 60/203 |

Primary Examiner—Duane A. Reger
Assistant Examiner—Jesus D. Sotelo
Attorney, Agent, or Firm—Edward J. Norton; Joseph D. Lazar

[57] ABSTRACT

A flight auxiliary propulsion system for velocity trim, station keeping, momentum adjustment for a spacecraft comprising rocket or reaction motors, also designated thrusters, utilizing thermally decomposable monopropellants such as hydrazine and other derivatives, thereof hydrogen peroxide, and isopropyl nitrate. The thrusters are arranged in a distribution or manifold system so that one set of thrusters provides for relatively large thrusts of force in the order of 1 to 5 pounds and another set of thrusters develop low thrusts in the millipound range. The large thrusts are developed by the catalytic decomposition of the monopropellant into a thrust chamber and through a throat and expansion nozzle to the ambient externally of the spacecraft. The low level thrusts are developed by heating catalytically or thermally decomposed monopropellant by electrical heating elements more commonly known as resisto-jet elements. Dual thrust levels may also be achieved by a common motor with a controllable resisto-jet and variable throat-area control.

10 Claims, 5 Drawing Figures 3,807,657

DUAL THRUST LEVEL MONOPROPELLANT SPACECRAFT PROPULSION SYSTEM

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

This invention relates to space vehicle auxiliary propulsion systems and more particularly to propulsion systems utilizing thermally or catalytically decomposable monopropellants.

2. Description of the Prior Art

Auxiliary propulsion systems are required by most spacecrafts to correct errors caused by the ejection or launching of the spacecraft into orbit, to acquire and maintain the spacecraft in its orbit or in its geo-stationary position above the earth, and to control the spacecraft's attitude for proper power generation, thermal control and system functions. Various means for effecting propulsion have been used in the art including magnetic torquing, gravity responsive systems, solar wind devices, and the use of decomposable fuels such as hydrogen peroxide and hydrazine as propellant through motors or thrusters for long term missions of geo-stationary spacecraft for two or more years. The use of electrostatic (ion) engines or motors has been considered useful because of their characteristic high specific impulses, the specific impulse, ($I_{sp}$) being a function of the chamber temperature and the molecular weight of the exhaust products. Although the ion engines are seemingly attractive for use in station keeping they are extremely complex and of necessity are constrained to very low thrust levels because of large power requirements. This makes ion motors impractical for use in the satellite orbit acquisition phase of any maneuver in which a relatively large impulse bit is required in a short period of time. For these reasons the use of an ion engine for station keeping also requires a chemical system for other maneuvering functions. In order to achieve the most effective or optimum utilization of available propellant for a propulsion system, the weight of the propellant is of critical importance.

One solution for saving weight is in the use of a single propellant for all propulsive functions. The use of a monopropellant for developing both large and small thrusts has been proposed, but no such system has demonstrated any significant improvement toward an optimum utilization of the propellant throughout the life of the mission. The present invention provides a flight auxiliary propulsion system that achieves both large as well as small thrusts levels for significantly large periods of mission life.

SUMMARY OF THE INVENTION

A flight auxiliary propulsion system for attitude control station acquisition and station keeping for a spacecraft comprises a source of liquid monopropellant distributed through a manifold into a spacecraft body-mounted group of thrusters. One set of thrusters is arranged to develop relatively large level thrusts, in the order of 1 pound force or greater, and another set of thrusters is arranged to develop relatively low level thrusts in the order of 0.01 to 0.05 pounds force. Thruster valves are used to selectively utilize fuel in either one or the other of the groups of the thrusters. The dual thrust-level propulsive forces of the thrusters may be accomplished in a common thruster by controllable auxiliary electrical heating of the propellant and variable throat control of the nozzle for changing the effective thrust therethrough.

DETAILED DESCRIPTION OF A PREFERRED EMBODIMENT

Figure 1:
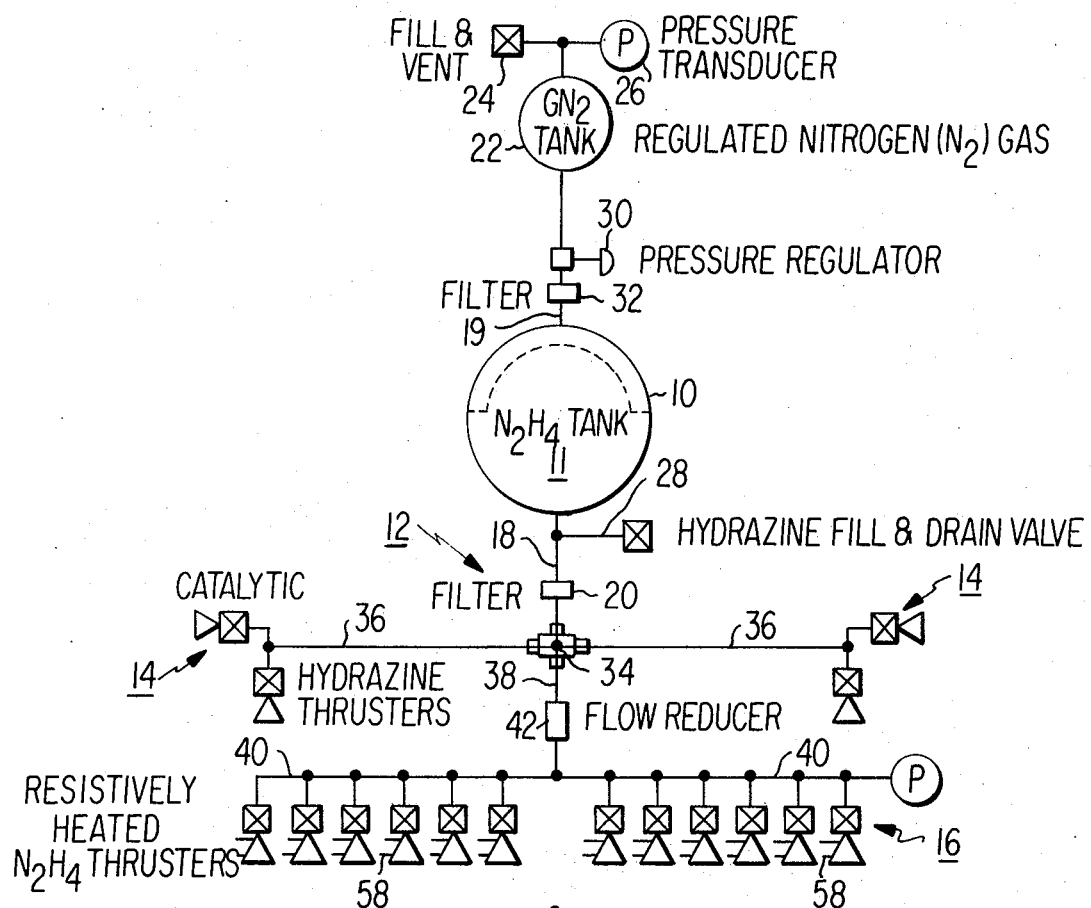
FIG. 1 is a schematic diagram of the dual thrust level propulsion system for a spacecraft according to the invention.

FIG. 1 illustrates in schematic form a dual thrust level propulsion system for a spacecraft according to the invention. A reservoir 10 of liquid propellant fuel such as hydrazine ($N_2 H_4$) is pressure fed into a manifold 12 distributed to high level thrusters 14 and low level thrusters 16, suitably positioned on the spacecraft to direct the expelled propellant as the exhaust into the ambient for causing the desired reaction forces for maneuvering the spacecraft.

The liquid propellant 11 is conducted in the manifold through a first pipe 18 having a microporous filter 20 for removing any extraneous particulate matter. A fill and drain valve 28 provides access to this sysetm for adding and removing the propellant. System pressurization is derived from a high pressure tank 22 of gas such as nitrogen ($N_2$), at a pressure of suitably 3000 pounds per square inch. Pressurization gas may also be stored in the same tank with the propellant. The pressurized tank of gas 22 is provided with a valve 24 through which the gas is filled and vented. Pressure transducer 26 monitors supply pressure. A pressure regulator 30 provides a means for adjusting the pressure from the pressure tank 22 that is applied to the liquid propellant tank 11 through a filter 32 for cleansing the pressurized nitrogen gas prior to the entry to the propellant reservoir 10 via the pressure feed line 19.

The liquid propellant 11 may be conducted from the tank 10 to a distribution control valve 34 with suitable control means (not shown) for metering the liquid propellant through the manifold portions 36 to the high-level thrusters 14 or through the manifold portions 38 and 40 to the low level thrusters 16. The valve 34 may be operated by suitable control signals preferably under manual control at a ground station via signal communication links with the spacecraft. When valve 34 is controlled to pass the propellant to the thrusters 14, the pressure of the propellant is conducted thereto at substantially the pressure of the propellant from the reservoir 10 which is suitably 300 psia or less. When the valve 34 is adjusted to pass the liquid propellant 11 to the thrusters 16 a pressure drop is effected through the flow reducer 42 which may be a porous plug, a fixed orifice with restricted aperture relative to the cross section of the manifold 38, or any other suitable pressure drop device known in the art. The propellant 11, at a reduced pressure, is conducted through the manifold 40 to each of the several thrusters 16. The valve 34 may be removed in the distribution system, the control of the propellant to the individual thrusters being accomplished by the control valves at each of the thrusters.

Figure 2:
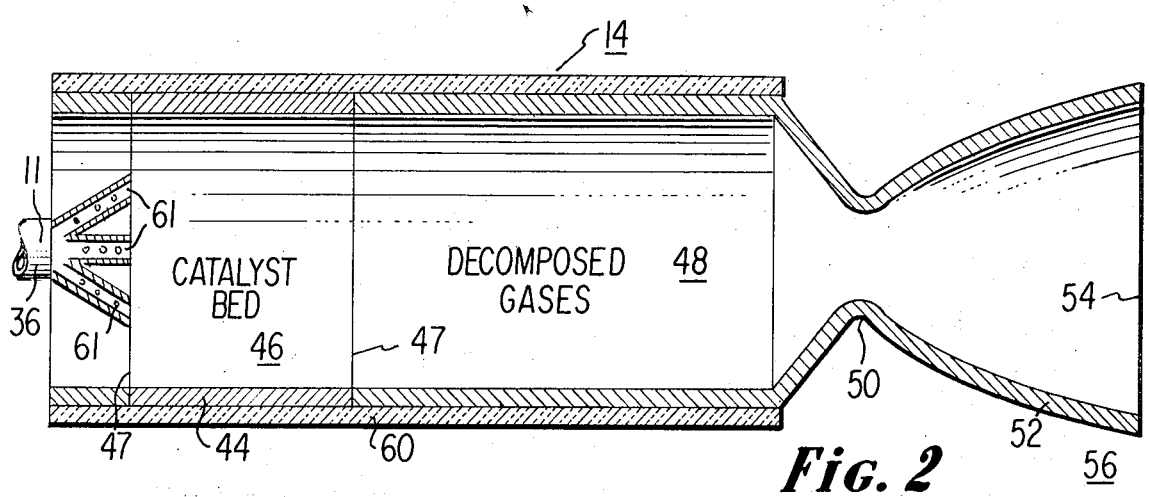
FIG. 2 is a schematic drawing of a thruster for developing the relatively large-level thrusts.

Referring now to FIG. 2 there is shown an enlarged sectional view of a typical thruster 14. The thruster is formed integrally of a cylindrical portion 44 for housing the catalyst bed 46. A frusto-conical portion 48 defines the chamber into which the decomposed gases from the catalyst bed 46 expand. The chamber is confined by a retention screen 47. Chamber 48, is tapered to a throat portion 50 and is thereafter expanded into a flaring nozzle portion 52, the exit 54 of which being exposed to the ambient 56 for expelling the spent gases. A typical thruster 14 is about 7 ½ inches long and has an outside diameter of 2 inches. It is formed suitably of a high strength, nickel base corrosive resistant alloy adapted to contain the decomposed gases at the operating pressures and temperatures. Such a typical alloy is manufactured by the Union Carbide Company under the trade name Hastalloy 25.

In operation, the liquid propellant 11, preferably hydrazine, is conducted by the manifold portion 36 into the catalyst bed 36 through a series of perforated distribution pipes 61 in the bed formed suitably of an aluminum oxide carrier impregnated with a catalyst material, such as Shell 405A ASBG. The hydrazine upon contact with the catalyst decomposes developing gases that are propelled into the chamber 48 at a temperature in the order of 1600°–1800°R and at pressures of which vary with the propellant supply pressure and are typically on the order of 100 psia. The decomposed gas in chamber 48 passes through the throat 50 expanding further into the nozzle portion 52 and into the ambient 56. The thrust developed is in the order of one pound or greater with a specific impulse of up to 250 seconds.

The force developed by the thrusters may be expressed by the following relationship:

$$F = C_F A_t P_c \quad (1)$$

where F is the force in pounds of thrust; $C_F$ is the thrust coefficient; $P_c$ is the chamber pressure within the chamber 48 in pounds per square inch (psia); and $A_t$ is the area of the cross section of the throat at 50 in square inches.

The specific impulse may be represented by an approximate relationship:

$$I_{sp} \approx (T_c/M)^{1/2} \quad (2)$$

where $I_{sp}$ is the specific impulse in seconds; $T_c$ is the chamber temperature (chamber 48) in degrees Rankine and M, the molecular weight of the products of combustion or decomposition in moles.

Any of the known thermally decomposible monopropellants may be used such as hydrazine, hydrogen peroxide, and isopropyl nitrate. Hydrazine is preferred since it developes the optimum specific impulse per unit of weight than any of the known monopropellants on the order of 230 seconds for a thruster of the type illustrated in FIG. 2.

A higher specific impulse ($I_{sp}$) is achieved by augmenting the enthalpy of the decomposition products of hydrazine by the application of heat in the gas chamber 48, which heat causes the chamber temperature ($T_c$) of equation (2) to be increased. The manner of achieving the higher $I_{sp}$ by the application of heat according to the invention is accomplished by the thruster 16 illustrated in FIG. 3. The thruster 16 is similar in form as the thruster 14 (FIG. 2) in that it has a cylindrical portion 44 for the catalyst bed 46 with retention screen 47, a gas chamber 48, a throat portion 50, and a nozzle portion 52 having a mouth 54 for ejecting expanded gases into the ambient 56. The annular surface of chamber 48 is provided with an electrical coil 58. Heating coil 58 is suitably connected to a variable electrical supply source (not shown) for a controllable range of 0 to 150 watts. One such electrical heating coil arrangement is known in the art as a "resisto-jet." Suitable insulation 60 such as alumina silica fiber, or quartz fiber is provided as a sheath around the thruster particularly about the expansion chamber 48 which is subject to the greatest heat. A typical and suitable insulation of quartz fiber is manufactured by John Manville Company, under the trade name MIN-K. The thruster 16 is typically 5 inches in length with an outside diameter of about 2 inches. The housing generally is made of heat resistant alloys of suitable strength to meet the requirements of the long life expected of a thruster expected for spacecraft use for synchronous communication systems. Haynes alloy 25 also known as L 605 (a propietary alloy of Union Carbide) is a typical nickel based material for constructing the housing. A catalyst, suitably Shell 405, is used to effect propellant decomposition downstream of the injector as previously described.

In operation the propellant hydrazine 11 is pressure fed through the manifold 40 into the catalytic bed 46. The liquid propellant is decomposed by the catalyst and then expanded into the chamber 48 at a specific impulse ($I_{sp}$) of about 200 seconds. With the resisto-jet coils 58 energized, the gases of hydrazine 11 are heated to a higher temperature increasing the specific impulses ($I_{sp}$) to 300 seconds or greater depending upon the amount of heat added by the resisto-jet coils. For the full range of heating in a typical thruster, the specific impulse may be varied from 200 seconds to about 350 seconds.

Figure 4:
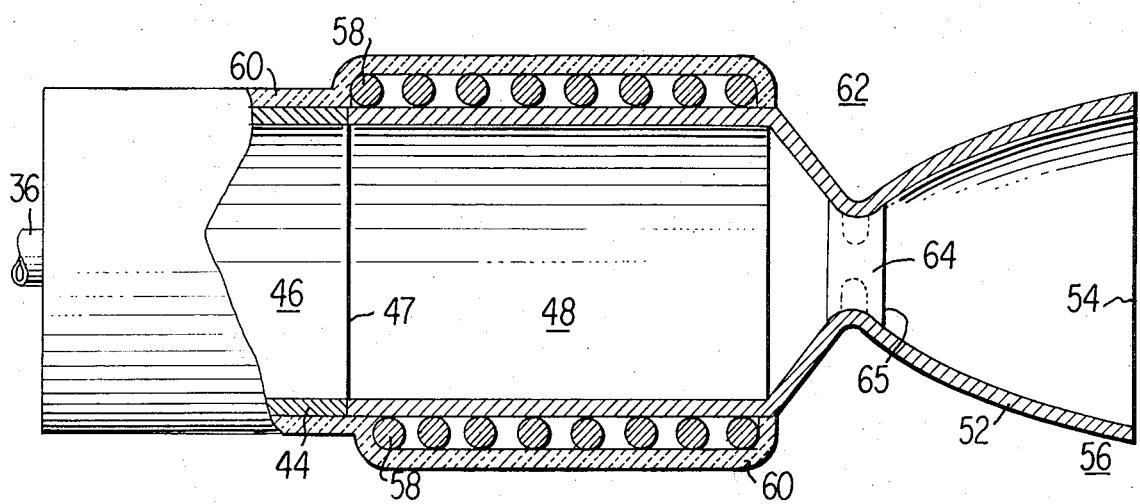
FIG. 4 is a schematic diagram of an integral thruster arranged to provided both high and low levels of thrust.

Referring now to FIG. 4 there is shown a thruster 62 providing both a high level thrust and a low level thrust within the same housing. The thruster 62 is provided with a catalyst bed 46 within the cylindrical portion 44, a high temperature gas chamber 48 having a resisto-jet coil 58, a nozzle 52 with a mouth portion 54.

The throat portion 64 of the thruster is provided with a suitable mechanism 65 to adjust the throat opening. The variable opening may be achieved by a shutter-type mechanism or any known means for varying the opening area of the throat. The variable throat mechanism 65 varies the throat aperture by suitable control means (not shown) through a signal link with the ground control station. The area of the throat will be typically 0.030 inches in diameter for small thrusts on the order of 100 milli-pounds, and will be adjustably expandable to a larger diameter of 0.10 inches for forces in the order of 1–5 pounds.

Figure 3:
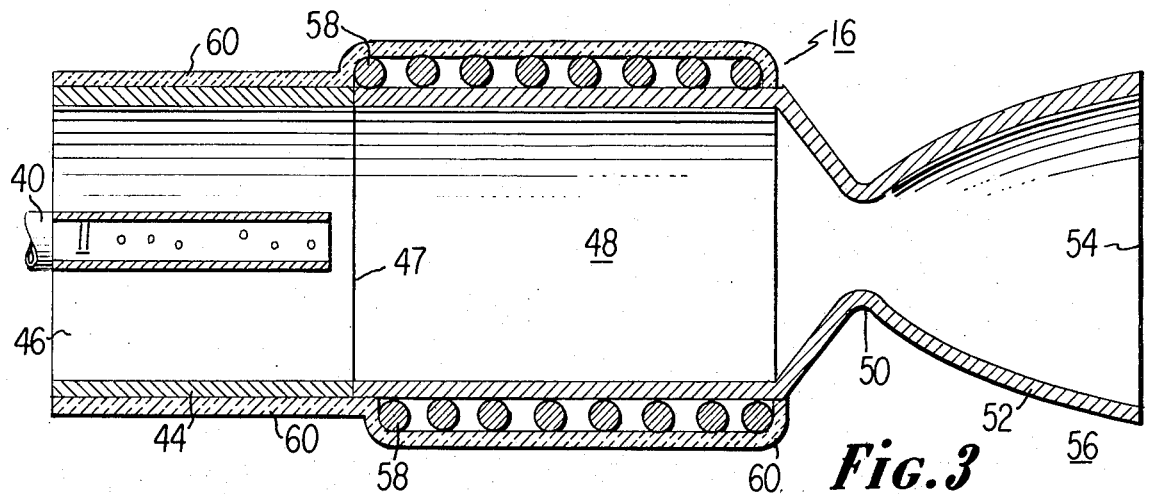
FIG. 3 is a schematic diagram showing a thruster for developing relatively low-level thrusts.

In operation, the thruster 62 may be included in a system such as shown in FIG. 1 utilizing the manifold 36, the thruster 62 (FIG. 4) replacing the thruster 14 (FIGS. 2 and 3). The thrusters 16 are not needed in this arrangement. The single pressurized level of the liquid propellant 11 is fed to the thruster 62 which converts the liquid propellant to a high temperature, high pressure gas for nozzle expulsion through nozzle throat 64. Adjustment of the variable area throat 64 changes the area and thus the thrust. Since the thrust is now a function of throat area, the need of a flow reducer, such as the device 42 for changing the pressure of the liquid propellant is obviated. By the arrangement of a single thruster 62, a monopropellant fuel may be used as a thruster to develop both high levels and low levels of expulsion thrust forces.

The high thrust levels provided by the thruster 14 or the thruster 62 (with a large opening of its throat 64 and without the operation of the resisto-jet coils 58) are used by orbiting spacecraft first, to cancel booster errors and dispersions and, thereafter, to acquire the desired station or orbit. Such high level thrusters are used also for any subsequent maneuvers which demand high thrust forces in a very short period of time. The dynamic response requirements of a spacecraft, however, often dictate the need for thrust levels on the order of milli-pounds. Such lower thrust levels are achieved by the thruster 16 (FIG. 3) and the thruster 62 (FIG. 4). The low thrust force levels generated by such thrusters serve as a reliable means for precise attitude control and station keeping essential for accurate spacecraft orientation. The force impulses developed by the thrusters using the decomposible propellant develop a steady state vacuum impulse throughout the desired duration which thereby assures accurate and consistent propulsion for attitude and station keeping purposes. The larger specific impulses achieved by augmenting the enthalpy of the decomposed products of the monopropellant, is limited according to this invention only by the temperature and structural properties of the materials selected to fabricate the thruster.

The throats of the several thrusters described have been illustrated with expansion cones (52), it being understood that the area of each of such throats contributes to the force developed by the respective thrusters in accordance with equation (1). It will be appreciated by those skilled in the art that such cones are not essential for the thrust operation. A slight performance reduction is effected by the elimination of such expansion members which will not affect the principle of operation of the present invention.

Although the preferred form of propellant as described in the several embodiments is hydrazine, other propellants may be used. For example, any of the hydrazine derivatives such as methyl hydrazine, as well as symmetrical and unsymmetrical di-methyl hydrazine will serve as a propellant.

Furthermore, any of the known catalytic metals taken from group VIIIb of the Periodic Table may be used as the active constituent of the catalytic bed.

According to the invention, thus, increasing the enthalpy of the propellant whereby higher specific impulses of a given monopropellant are achieved, allows for a significant reduction in the weight of the propellant that is needed for a spacecraft mission of a given duration.

Figure 5:
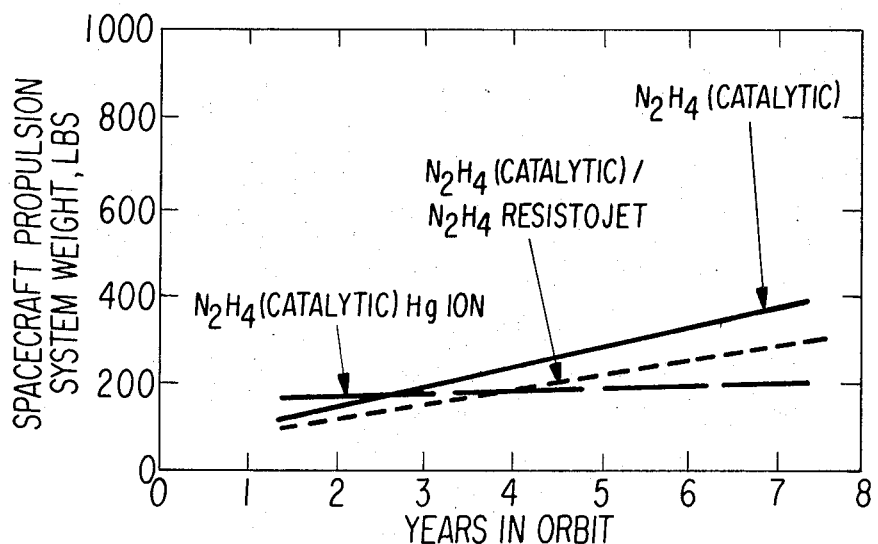
FIG. 5 is a plot of the weight of a propulsion system for each of several competitive systems as a function of mission life.

Referring to FIG. 5 there is illustrated in line graph form a comparison of various propulsion systems that may be used for the long-lived spacecraft missions in terms of the years in orbit for an initial weight of propellant carried by the spacecraft. As described above, the ion engine can develop specific impulses of about 3,000 seconds. It is interesting to note that although the specific impulse of a hydrazine resisto-jet is in the order of magnitude below that of an ion engine ($I_{sp} = 340$ seconds vs. 3,000 seconds), the dual thrust-level hydrazine combination is highly competitive in overall propulsion system weight.

For mission lifetimes of less than four years, the hydrazine/resisto-jet system is lighter than a hydrazine/ion system. For longer mission lives, for example, seven years, the hydrazine/hydrazine resisto-jet is approximately 30 percent heavier than a hydrazine/ion system. For the seven year life requirement with 1,500 pound spacecraft and 10 milli-pounds thrust, the hydrazine resisto-jet requires a total steady state burn time of approximately 1,450 hours to satisfy the mission demands. Ten milli-pound thrust level, hydrogen fueled and ammonia fueled resisto-jets have completed 8,000 hour endurance tests at 50/50 duty cycles. The working fluid in a hydrazine resisto-jet is composed of ammonia, hydrogen and nitrogen.

In addition to simplicity of design and reliability, a hydrazine/hydrazine resisto-jet system according to this invention provides a unique system of redundancy not available in other propulsion systems. For example, for those missions utilizing long-term station keeping, even if the simple electro-thermal device (resisto-jet) fails, a portion of the long-term, station keeping function can be provided by the catalytic decomposition of hydrazine remaining in the propellant tanks. Also, any propellant not required in the initial phases of the mission to cancel booster dispersions or acquire the planned station is available to the resisto-jet to extend orbital lifetime. This possibility cannot be achieved by conventional propulsion systems.

While the specific embodiments of the inventions described above have utilized catalytic decomposition of the monopropellant for both high and low level thrusting, thermal decomposition may alternatively be employed in low-level thrusters.

What is claimed is:

1. A flight auxiliary propulsion system for attitude control, velocity trim, station keeping, and the like for spacecraft, comprising:
   a. means forming a container for a decomposable monopropellant liquid,
   b. means forming a manifold for distributing monopropellant liquid from said container to a first group or a second group of two groups of thrusters,
   c. said first group of thrusters having means for developing relatively low-level thrust forces by first decomposing said monopropellant liquid into gaseous components, and therafter heating the gaseous components,
   c1. each of said first thrusters having a first portion for decomposing said liquid into said gaseous components, a second portion for heating said gaseous components, and a throat portion through which the heated gaseous components are expelled, c2. said throat of each of said first group of thrusters being proportioned to develop a relatively low-level thrust force, d. said second group of thrusters having means for developing relative large-level thrust forces by catalytic decomposition of said monopropellant liquid into gaseous components, d1. each of said second group of thrusters having a throat portion through which said gaseous components are expelled, d2. said throat portion of each of said second group of thrusters being proportioned to develop a relatively large-level thrust force, e. valve means in said manifold for selectively distributing said monopropellant liquid either to said first or to said second groups of thrusters, f. a pressure reducing means in said monopropellant distribution manifold to reduce the monopropellant feed pressure to said first group of said two groups of thrusters, g. said relatively low-level thrust forces being in the order of 0.01 to 0.10 pounds force and said relatively large-level thrust forces being in the order of one to five pounds force.

2. A system according to claim 1 wherein the means for decomposing the monopropellant liquid in said first portion of said first group of thrusters comprises catalytic means for catalytically decomposing the liquid into gaseous components.

3. A system according to claim 2 wherein said means for heating said gaseous components includes an electrical heating coil surrounding said second portion containing said gaseous components.

4. A system according to claim 1 wherein said monopropellant is taken from the group of hydrazine derivatives consisting of:

methyl hydrazine, symmetrical and unsymmetrical dimethyl hydrazine.

5. A system according to claim 1 wherein said monopropellant is hydrazine.

6. A system according to claim 1 wherein said monopropellant is hydrogen peroxide.

7. A system according to claim 1 wherein said monopropellant is isopropyl nitrate.

8. A system according to claim 2 wherein said catalytic means is a metal taken from the group consisting of group VIII*b* of the Periodic Table.

9. A flight auxiliary propulsion system for attitude control, velocity trim, station keeping, and the like for spacecraft, comprising:

a. means forming a container for a decomposable monopropellant liquid, b. means forming a manifold for distributing monopropellant liquid to one or more thrusters, c. each of said thrusters having a chamber for decomposing said liquid into gaseous components and a chamber for heating said gaseous components, d. each of said thrusters having a nozzle for passing said gaseous components into the ambient, said nozzle having a throat and means to vary the cross-sectional area of said throat to alter thereby the force of thrust developed by said gaseous components passing outwardly through said nozzle within the range in the order of 0.01 to 5.0 pounds force of thrust, e. variable controllable heating means for heating the gaseous components in said heating chamber to vary the specific impulse developed by said gaseous components as they pass outwardly through said nozzle.

10. A method for operating a propulsion system for spacecraft comprising the steps of:

a. decomposing a first portion of a supply of decomposable monopropellant liquid into its gaseous components, b. passing said first portion components through a relatively large nozzle for developing relatively large-level thrusts in the order of one to five pounds force, c. decomposing another portion of the supply of said decomposable monopropellant liquid into its gaseous components, d. heating said another portion of said gaseous components to increase the specific impulse of said gases, e. passing said heated components through a relatively narrow nozzle for developing thrusts of a relatively low-level thrust in the order of 0.01 to 0.10 pounds force.

* * * * *